United States Patent [19]
Julow

[11] 3,724,211
[45] Apr. 3, 1973

[54] REAR SEAL FOR SERVOMOTOR
[75] Inventor: Thomas M. Julow, South Bend, Ind.
[73] Assignee: The Bendix Corporation, South Bend, Ind.
[22] Filed: June 30, 1971
[21] Appl. No.: 158,327

[52] U.S. Cl. ................... 60/54.6 P, 92/168, 308/3.5
[51] Int. Cl. ........................... F15b 7/00, F16j 15/18
[58] Field of Search ........... 92/168; 308/3.5, 36.1, 26

[56] References Cited
UNITED STATES PATENTS

| | | | |
|---|---|---|---|
| 3,410,179 | 11/1968 | Kytta et al. | 92/168 |
| 3,329,453 | 7/1967 | Patton | 308/26 |
| 3,215,477 | 11/1965 | Arthur | 308/26 |
| 3,625,327 | 12/1971 | Birdsey | 308/26 |
| 3,289,547 | 12/1966 | Kytta | 92/168 |

*Primary Examiner*—Martin P. Schwadron
*Assistant Examiner*—A. M. Zupcic
*Attorney*—Leo H. McCormick, Jr. et al.

[57] ABSTRACT

A combined seal and bearing member for aligning a force transmitting member of a servomotor. A U-shaped retainer frictionally held in an opening of the housing of the servomotor has a first leg surrounded by a resilient member. A hinged lip attached to the resilient member surrounds a tubular projection of the force transmitting member and seals the opening in the housing. A resilient wedge adjacent the first leg has its apex near a second leg of the U-shaped retainer. The second leg holds the bearing member which surrounds the tubular projection in contact with the resilient wedge. The resilient wedge will permit the bearing member to move transversely inside the retainer to align the tubular projection with the rear bearing of a power piston of a master cylinder.

4 Claims, 5 Drawing Figures

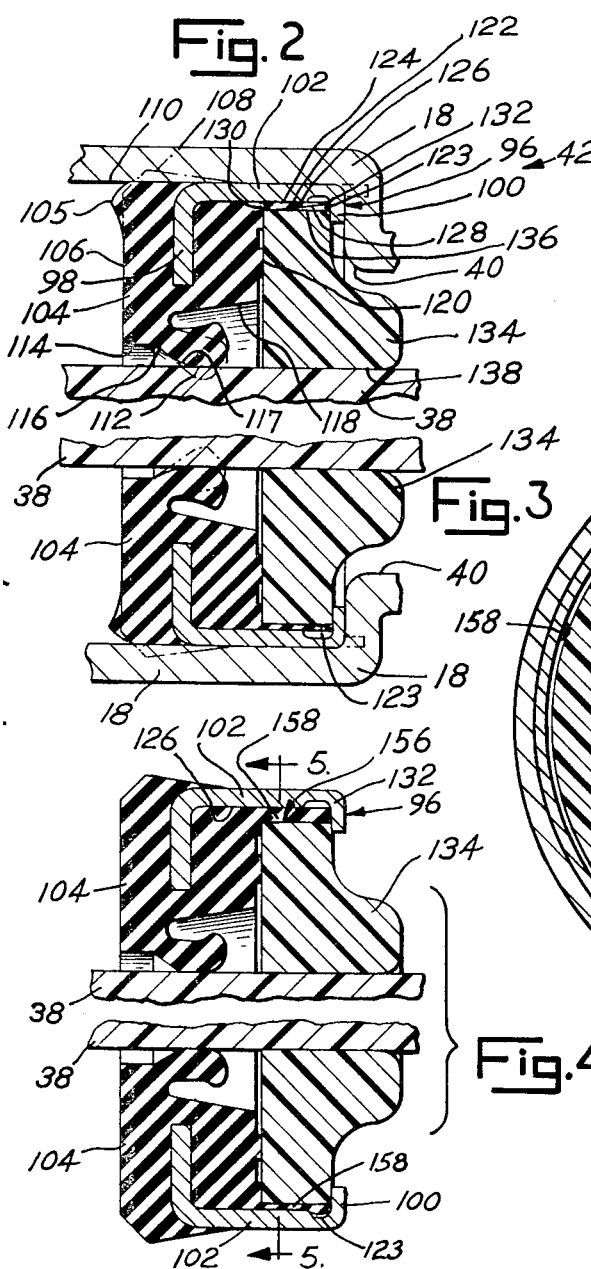

REAR SEAL FOR SERVOMOTOR

BACKGROUND OF THE INVENTION

Servomotors are generally employed in power braking systems to provide a power assist to the manual input force of the operator to energize a master cylinder. In servomotors that are operated by partial vacuum and atmospheric pressure, the housing of the servomotor must be sealed to provide an effective power assist. Normally, this type of servomotor has a movable wall which is suspended in vacuum. The movable wall is connected to a hub which has a tubular projection extending through an opening in the housing of the servomotor. The hub has passageways connected to both sides of the movable wall. A control valve carried inside the tubular projection is responsive to the manual input force transmitted by a push rod connected to the actuation pedal. The control valve will interrupt the vacuum supplied to one side of the wall while permitting atmospheric pressure to the other side thereby creating a pressure differential. This pressure differential across the wall will develop a force which will move the hub and cause the tubular projection to slide on a bearing member adjacent a seal in the opening of the housing. As the hub moves, a corresponding output force is transmitted through a push rod to a power piston of a master cylinder.

The most effective output force will occur when the bearing surface holds the tubular projection in axial alignment with the power piston of the master cylinder.

In some instances misalignment can occur between the tubular projection and the power piston because the opening in the housing is eccentric. When the bearing member is inserted in an eccentric opening, there is the possibility that the bearing member will be cracked or, at least, increased frictional drag will be present upon moving of the tubular projection by the wall. If the bearing member has been cracked, after a number of brake applications which cause the tubular projection to move, the surface of the tubular projection will become scored. The scored portion will act as a rasp as the wall moves and deteriorate the seal to a point where vacuum will not stay in the servomotor. Without vacuum, the servomotor will be inoperative and the power piston of the master cylinder will have to be manually activated to supply the power to the braking system for stopping a vehicle.

SUMMARY OF THE INVENTION

To prevent damage to the tubular projection of the hub means in a servomotor and ultimately the seal closing the opening in the housing of the servomotor, I have invented a combined bearing and seal means which will seal the opening and provide a resiliently positionable surface for axially aligning the hub means with an output member.

A U-shaped annular retainer has its front leg encased in a flexible material and a lip is attached to this flexible material. An annular wedge of resilient material is placed between the front leg and the rear leg of the U-shaped retainer. Bearing means of a smaller diameter than the retainer is held in contact with an annular wedge of resilient material by the rear leg, and this device frictionally placed in the opening in the servomotor. If the shape of the opening and the annular retainer are not exactly alike, the resilient wedge will be compressed as the U-shaped retainer is frictionally placed in the opening. In being compressed the axial alignment between the input member and the output member will be established and maintained without damaging the tubular projection of the hub means since the bearing means can move independently of the U-shaped annular retainer.

It is therefore the object of this invention to provide a seal means with a bearing surface which can be shifted axially.

It is another object of this invention to provide a seal means capable of being inserted in an eccentric opening without internal damage to a bearing surface contained therein.

These and other objects will become apparent to those who read this specification and view the drawings.

BRIEF DESCRIPTION OF THE DRAWINGS

FIG. 2 is an exploded view of the circumscribed portion 2 of FIG. 1 showing the seal and bearing means for aligning the hub means with the input means;

FIG. 3 is a sectional view of the circumscribed portion 3 of FIG. 1;

FIG. 4 is a sectional view of another embodiment of the seal and bearing means for aligning the hub means with the input means;

FIG. 5 is a sectional view taken along line 5—5 of FIG. 4 showing the hub means positioned in the bearing means to be in alignment with the input means.

DETAILED DESCRIPTION OF THE PREFERRED EMBODIMENT

Figure 1:
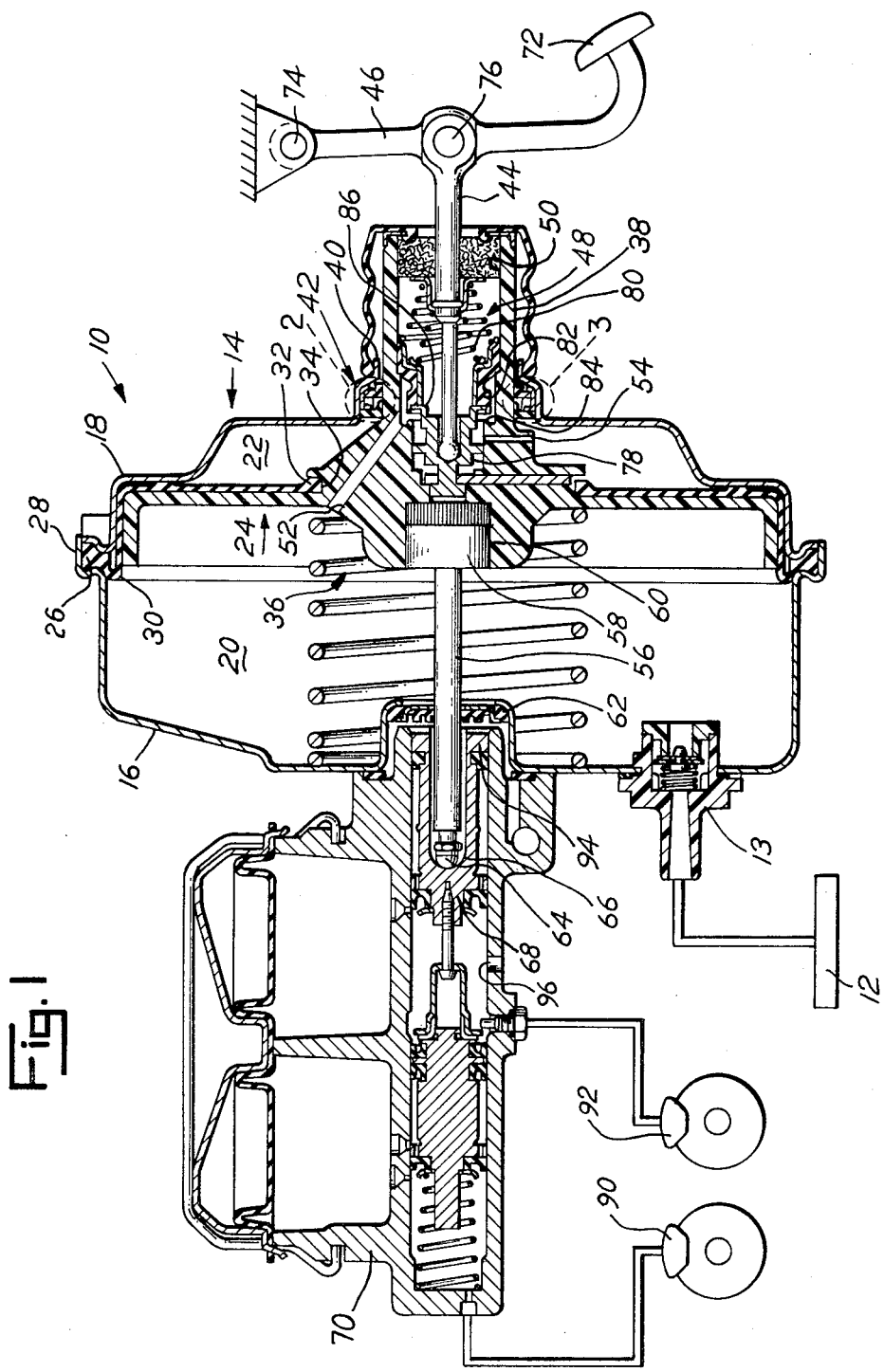
FIG. 1 is a schematic illustration of a power braking system showing the axial alignment of an input means, a hub means of a servomotor, an output transmitting means and a power piston of a master cylinder.

The power braking system 10 shown in FIG. 1 is operated by partial vacuum created at the intake manifold 12 of a vehicle. The partial vacuum is communicated through check valve 13 to a servomotor 14 which has a front shell 16 joined to a rear shell 18 to form a housing. The interior of the housing is divided into a front chamber 20 and a rear chamber 22 by wall means 24. The wall means 24 has a diaphragm 30 with an outer periphery 26 held by the twist lock connector 28 which joins the front shell 16 to the rear shell 18. The inner periphery 32 of the diaphragm 30 is snapped into a groove 34 of hub means 36. A tubular projection 38 connected to the hub means 36 extends through an opening 40 in the rear shell 18. Bearing means 42 holds the tubular projection 38 in axial alignment with the power piston 68 of the master cylinder 70. Valve means 48 located in the bore 50 of the tubular projection 38 controls the communication of the partial vacuum through a first passageway 52 from the front chamber 20 of the servomotor 14 to the bore 50 and out a second passageway 54 to the rear chamber 22. A push rod 56 has a head 58 retained in an annular opening 60 in the hub means 36 and spherical head 64 which extends through a seal 62 of a type shown in U.S. Pat. No. 3,178,191 and incorporated herein by reference into a conical section 66 of the power piston means 68 of the hydraulic master cylinder 70.

In operation, an operator pushes on pedal 72 causing arm 46 to pivot around pin 74. As arm 46 pivots on pin 74, an input force will be communicated through pin 76 to input rod 44. The force from input rod 44 will cause the plunger means 78 of the control means 48 to move and permit resilient member 80 to seat a flexible member 82 on face 84 closing the communication of partial vacuum through passage 52 to the bore 50. Further movement of the plunger means 78 will permit communication of air under atmospheric pressure through opening 86 into bore 50 out the second passageway 54 to the rear chamber 22.

With partial vacuum in the front chamber 20 and air under atmospheric pressure in the rear chamber 22 a pressure differential will occur across the wall means 24. The pressure differential pressure will act on the area of the diaphragm 30 creating a force which will cause the tubular projection 38 to slide in bearing means 42 as the force is transmitted through push rod 56 to the power piston means 68. Movement of the power piston means 68 will pressurize fluid in the master cylinder to operate the front 90 and rear 92 wheel brakes of the vehicle.

When the axial alignment between the input rod 44, the tubular projection 38, the output push rod 56 and the power piston means 68 is maintained, the most effective and efficient utilization of the force produced by the pressure differential will be achieved. With bearing means 42 and 94 properly positioned, this alignment will be achieved. Bearing means 94, which surrounds power piston means 68, is rigidly held in bore 96 of the master cylinder 70. The position of bearing means 42 which surrounds the tubular projection 38, alone is movable to permit axial alignment to be adjusted.

In more particular detail, as shown in FIG. 2, the bearing means 42 consists of an annular retainer member 96 which has a cylindrical body 102 connected to an annular front leg 98 and an annular rear leg 100. The front annular leg 98 is encased with a first resilient means 104 having a front face 106 with a portion 108 as shown by the dash line, to extend beyond the periphery of the retainer member 96. Upon insertion of the bearing means 42 into the opening 110 of the rear shell 18, portion 108 is compressed and bulges as shown by bump 105 along the front face 106 to resiliently seal the opening 110. A resilient lip 112 is attached to the inner periphery 114 of the front face 106 by a thin annular portion 116. The thin annular portion 116 acts as a hinge permitting the lip 112 to extend on a bevel 117 toward and surrounding the tubular projection 38. A recess 118 extends from the point of connection of the thin annular portions 116 with the inner periphery to the rear face 120 of the first resilient means 104 which allows the lip 112 lateral movement and yet maintains a seal as the tubular projection 38 moves axially.

A second annular resilient means 122 has a cylindrical surface 124 which abuts the inner periphery 126 of the cylindrical body 102 of the retainer member 96 and extends from the annular rear leg 100 to the rear face 120 of the first resilient means 104 separated from an annular sloping surface 128 by an annular wedge 130 having its apex 132 adjacent the rear leg 100.

A bearing member 134 has an outer periphery 136 of a smaller diameter than the inner periphery 126 of the cylindrical body 102 and an inner periphery 138 which surrounds the tubular projection 38. The annular rear leg 100 holds the outer periphery 136 of the bearing member 134 in contact with the sloping surface 128.

As the bearing means 42 is inserted in the opening 110, the cylindrical body 102 will conform to the shape of the opening 110. Any eccentricity in the opening will not affect the bearing member 134 since the second annular resilient means 122 will flow into the space provided by the annular groove 123 between the cylindrical surface 124 and the outer periphery 136, as shown in FIG. 3. Thus, the bearing member 134 can move transversely in the retainer member 96 to maintain the hub means 36 in axial alignment with the bearing means 94 of the power piston.

The embodiment shown in FIG. 4 is the same as that shown in FIG. 2 with the exception of the second resilient means 122 of FIG. 3. In the FIG. 4 embodiment, the second resilient means is designated by the numeral 156 and consists of a plurality of resilient flutes or hemispherical member 158 radially positioned on the inner periphery 126 of the cylindrical body 102. Upon holding the bearing member 134 in contact with the flutes 158 by the rear leg 100 and insertion in opening 110, any eccentricity in the opening 110 will be absorbed in the cylindrical body 102 which will cause the resilient flutes 138 to be distorted as shown in FIG. 5. This distortion in the flutes will permit the bearing member 134 to move transversely while maintaining axial alignment of the hub means 36 with the power piston.

Thus, I have provided a servomotor with bearing means which will prevent frictional drag between the bearing surface and the movable hub means caused by eccentricity between the bearing retainer and the opening in the servomotor. I have thereby eliminated the potential cause of many servomotor failures and provided a bearing means with the capacity to be shifted to maintain axial alignment of the means transmitting the power produced in the servomotor and the power piston of an energizable hydraulic cylinder.

I claim:

1. A servomotor having a front shell secured to a rear shell to form a housing for retaining wall means, said wall means being responsive to a pressure differential to cause hub means connected thereto to move and transmit an operational force through an output member to a power piston of a master cylinder attached to the front shell, said hub means having an annular projection held in an opening in the rear shell by bearing means, said bearing means maintaining the hub means in axial alignment with the power piston to directly transmit the operational force without binding, said bearing means comprising:

an annular retainer member having a first end and a second end, a cylindrical surface, said cylindrical surface having a first inner and outer periphery substantially parallel to the axial alignment between the hub means and the power piston, said first outer periphery being frictionally retained in the opening in the rear shell, said first inner periphery having a first annular groove adjacent said second end of the cylindrical surface;

a first annular leg attached to the first end of said cylindrical surface extending toward the annular projection of said hub means;

first annular resilient means having a first annular portion with a second outer periphery of a larger diameter than the opening in the rear shell, said first annular portion being secured to said first annular leg, said second outer periphery sealing the opening in the rear shell adjacent the first outer periphery of the annular retainer member;

a second annular portion secured to the first annular leg and the first inner periphery of the annular retainer member, said second annular portion having a second groove therein;

a third annular portion for connecting the first and second annular portions together to form a unitary seal surrounding said first annular leg;

a resilient lip hingedly attached to said first annular portion and extending away from the first annular leg on a bevel toward the annular projection of said hub means, said resilient lip surrounding said annular projection to seal the opening in the rear shell, said second groove providing a holding space for a portion of said resilient lip when the resilient lip surrounds the annular projection of the hub means;

a second annular resilient means secured to said second annular portion of the first annular resilient means, said second annular resilient means having a bearing surface which abuttingly extends along the first inner periphery and covers said first annular groove on the annular retainer member;

bearing means having an inner surface surrounding the annular projection of the hub means and an outer surface contacting said bearing surface causing the second resilient means to radially flow into said first annular groove permitting said bearing means to move transversely with respect to said annular retainer member to alleviate any eccentricity in said annular retainer during retention in said opening in said rear shell to thereby maintain said hub means in axial alignment with said power piston; and a second annular leg attached to said second end of said cylindrical surface of the retainer member for holding said bearing means in contact with said second annular portion of the first annular resilient means.

2. The servomotor, as recited in claim 1, wherein said second annular resilient means includes:

a plurality of resilient flutes secured to said second annular portion of the first annular resilient means for positioning said bearing means in said retainer means.

3. The servomotor, as recited in claim 1, wherein said second annular resilient means includes:

a cylindrical surface attached to the inner periphery of the retainer member and extending from the second annular portion of the first annular resilient means to the second annular leg;

an annular sloping surface extending from the second annular leg to the second annular portion, said sloping surface permitting said bearing means to be moved within said retainer means to align said hub means with said power piston; and a surface abutting said second annular portion to support the sloping surface.

4. The servomotor, as recited in claim 1, wherein said second annular resilient means includes:

an annular wedge having an apex adjacent the second annular leg, said annular wedge providing a varying surface for contacting the bearing means to permit the bearing means shift inside the annular retainer member and to align the annular projection of the hub means with the power piston of the master cylinder.

* * * * *